(12) United States Patent
Kim et al.

(10) Patent No.: US 7,777,982 B2
(45) Date of Patent: Aug. 17, 2010

(54) DISTURBANCE COMPENSATION DETERMINATION APPARATUS, A RELATED METHOD, A COMPUTER-READABLE MEDIUM STORING A COMPUTER PROGRAM RELATED TO THE METHOD, AND A DISK DRIVE COMPRISING THE APPARATUS

(75) Inventors: Nam-guk Kim, Anyang-si (KR);
Sung-won Park, Yeongdeungpo-gu (KR); Sang-hoon Chu, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 627 days.

(21) Appl. No.: 11/772,959

(22) Filed: Jul. 3, 2007

(65) Prior Publication Data

US 2008/0123480 A1    May 29, 2008

(30) Foreign Application Priority Data

Jul. 5, 2006    (KR) ............. 10-2006-0062978

(51) Int. Cl.
*G11B 5/596* (2006.01)
(52) U.S. Cl. ................................. 360/77.04
(58) Field of Classification Search ............. 360/77.04, 360/77.05, 75, 31, 25; 701/101; 702/104, 702/146, 185; 375/344; 340/435
See application file for complete search history.

(56) References Cited

U.S. PATENT DOCUMENTS

| | | | | |
|---|---|---|---|---|
| 4,281,388 A * | 7/1981 | Friend et al. | ................ | 702/146 |
| 4,641,325 A * | 2/1987 | Hughes | ................ | 375/344 |
| 5,602,347 A * | 2/1997 | Matsubara et al. | ..... | 73/862.193 |
| 5,740,045 A * | 4/1998 | Livshiz et al. | ................ | 701/101 |
| 5,872,536 A * | 2/1999 | Lyons et al. | ................ | 342/70 |
| 6,225,891 B1 * | 5/2001 | Lyons et al. | ................ | 340/435 |
| 6,819,517 B2 * | 11/2004 | Fioravanti et al. | ............. | 360/75 |
| 7,490,015 B2 * | 2/2009 | Spahlinger | ................ | 702/104 |
| 2008/0033695 A1* | 2/2008 | Sahara et al. | ................ | 702/185 |

FOREIGN PATENT DOCUMENTS

| | | |
|---|---|---|
| JP | 05242509 | 9/1993 |
| KR | 100260435 B1 | 4/2000 |
| KR | 1020010017826 A | 3/2001 |

* cited by examiner

*Primary Examiner*—Fred Tzeng
(74) *Attorney, Agent, or Firm*—Volentine & Whitt, PLLC

(57) ABSTRACT

A disturbance compensation determination apparatus, a related method, a computer readable medium storing a computer program related to the method, and a disk drive comprising the apparatus are provided. The disturbance compensation determination apparatus includes a disturbance observer (DOB) receiving a control input signal and a servo output signal of a plant, wherein the DOB calculates and outputs a current estimated disturbance value. The apparatus also includes a disturbance evaluation unit selectively changing a current disturbance compensation (DC) mode, wherein selectively changing the current DC mode comprises evaluating an accumulated estimated disturbance value in accordance with a condition corresponding to the current DC mode. In addition, the apparatus includes a switching unit selectively providing the current estimated disturbance value to a control loop of the plant in accordance with the current DC mode as selectively changed by the disturbance evaluation unit.

15 Claims, 7 Drawing Sheets

DISTURBANCE COMPENSATION DETERMINATION APPARATUS, A RELATED METHOD, A COMPUTER-READABLE MEDIUM STORING A COMPUTER PROGRAM RELATED TO THE METHOD, AND A DISK DRIVE COMPRISING THE APPARATUS

CROSS-REFERENCE TO RELATED APPLICATION

This application claims priority to Korean Patent Application No. 10-2006-0062978, filed on Jul. 5, 2006, the subject matter of which is hereby incorporated by reference in its entirety.

BACKGROUND OF THE INVENTION

1. Field of the Invention

Embodiments of the invention relate to a disturbance compensation determination apparatus, a related method, a computer-readable medium storing a computer program for executing the method, and a disk drive comprising the apparatus. In particular, embodiments of the invention relate to a disturbance compensation determination apparatus comprising a disturbance evaluation unit selectively changing a current disturbance compensation (DC) mode, a related disturbance compensation determination method, a computer-readable medium storing a computer program for executing the method, and a disk drive comprising the apparatus.

2. Description of the Related Art

Embodiments of the invention relate to Korean Patent Application No. 2001-017826 and Japanese Patent Application No. 1993-242509. Korean Patent Application No. 2001-017826 suggests a technique of measuring an amount of disk imbalance by analyzing a vibration frequency of a hard disk drive (HDD). Japanese Patent Application No. 1993-242509 suggests a technique of improving a disturbance countermeasure characteristic in an optical disk drive (ODD).

In general, a HDD is a data storage device in which data may be written to and read from a disk using a magnetic head. The trend in HDD technology is toward increasing storage capacity and data storage density of HDDs and decreasing the sizes of HDDs, which increases the bits per inch (BPI) and tracks per inch (TPI) in HDDs. BPI is the data storage density in a disk rotation direction (i.e., along a track of a disk), and TPI is the data storage density along a radius of a disk. In addition, the changes mentioned above require increasingly fine control of the head of a HDD.

The purpose of track-following control in a HDD is to precisely position a head over the center of a target track. However, track-following control errors may be caused by various kinds of disturbance. In particular, a micro drive, which is a portable drive, is susceptible to vibration or shock, which may cause disturbance.

If disturbance is applied to a disk drive, the disturbance is directly reflected in a position error signal (PES), and the applied disturbance may result in a decrease in read/write performance. In general, a disk drive has a controller for detecting a characteristic of an applied disturbance and compensating for the disturbance to keep the read/write performance of the disk drive stable even when disturbance is applied to the disk drive.

Because a conventional controller that compensates for disturbance focuses on disturbance compensation, a system including a conventional controller that compensates for disturbance is less stable than a controller that does not compensate for disturbance.

SUMMARY OF THE INVENTION

Embodiments of the invention provide a disturbance compensation determination apparatus determining whether to compensate for disturbance, a disk drive comprising the disturbance compensation determination apparatus, a related disturbance compensation determination method, and a computer-readable medium storing a computer program for executing the method.

In one embodiment, the invention provides a disturbance compensation determination apparatus comprising a disturbance observer (DOB) receiving a control input signal and a servo output signal of a plant, wherein the plant is controlled in accordance with the control input signal, the servo output signal corresponds to the control input signal, the DOB calculates and outputs a current estimated disturbance value, and the current estimated disturbance value is an estimate of disturbance applied to the plant. The apparatus further comprises a disturbance evaluation unit selectively changing a current disturbance compensation (DC) mode. Selectively changing the current DC mode comprises evaluating an accumulated estimated disturbance value in accordance with a condition corresponding to the current DC mode, wherein, during a current sample period, the DOB calculates zero or more preceding estimated disturbance values before calculating the current estimated disturbance value, and the disturbance evaluation unit calculates the accumulated estimated disturbance value by adding the absolute value of the current estimated disturbance value and the respective absolute values of the zero or more preceding estimated disturbance values. The apparatus still further comprises a switching unit selectively providing the current estimated disturbance value to a control loop of the plant in accordance with the current DC mode as selectively changed by the disturbance evaluation unit.

In another embodiment, the invention provides a disturbance compensation determination method comprising calculating a current estimated disturbance value, wherein the current estimated disturbance value is an estimate of disturbance applied to a plant. The method further comprises calculating an accumulated estimated disturbance value, wherein, during a current sample period, zero or more preceding estimated disturbance values were calculated before the current estimated disturbance value was calculated, and calculating the accumulated estimated disturbance value comprises adding the absolute value of the current estimated disturbance value and the respective absolute values of the zero or more preceding estimated disturbance values. The method still further comprises selectively changing a current disturbance compensation (DC) mode in accordance with the accumulated estimated disturbance value and a condition corresponding to the current DC mode, and selectively performing disturbance compensation in a plant control system using the current estimated disturbance value and in accordance with the current DC mode as selectively changed.

In yet another embodiment, the invention provides a computer-readable medium storing a computer program for executing a disturbance compensation determination method comprising calculating a current estimated disturbance value, wherein the current estimated disturbance value is an estimate of disturbance applied to a plant. The method further comprises calculating an accumulated estimated disturbance value, wherein, during a current sample period, zero or more preceding estimated disturbance values were calculated before the current estimated disturbance value was calculated, and calculating the accumulated estimated disturbance value comprises adding the absolute value of the current estimated disturbance value and the respective absolute values of the zero or more preceding estimated disturbance values. The method still further comprises selectively changing a current disturbance compensation (DC) mode in accordance with the accumulated estimated disturbance value and a condition corresponding to the current DC mode, and selectively performing disturbance compensation in a plant control system using the current estimated disturbance value and in accordance with the current DC mode as selectively changed.

In still another embodiment, the invention provides a disk drive comprising a controller estimating state information corresponding to motion of a head from a servo output signal and generating a control signal in accordance with the estimated state information, wherein the state information comprises position, speed, and bias values corresponding to the motion of the head; a disturbance observer (DOB) comprising a nominal plant inverse modeling tool, wherein the DOB estimates from the servo output signal an amount of disturbance applied to a head driving system using the nominal plant inverse modeling tool thereby calculating a current estimated disturbance value, and wherein the nominal plant inverse modeling tool implements the inverse of a function modeling the head driving system; and a disturbance evaluation unit selectively changing a current disturbance compensation (DC) mode. Selectively changing the current DC mode comprises evaluating an accumulated estimated disturbance value in accordance with a condition corresponding to the current DC mode, wherein, during a current sample period, the disturbance evaluation unit calculates zero or more preceding estimated disturbance values before calculating the current estimated disturbance value, and the disturbance evaluation unit calculates the accumulated estimated disturbance value by adding the absolute value of the current estimated disturbance value and the respective absolute values of the zero or more preceding estimated disturbance values. The disk drive further comprises a switching unit receiving the current estimated disturbance value, outputting the current estimated disturbance value when the current DC mode is a DC ON mode, and not outputting the current estimated disturbance value when the current DC mode is a DC OFF mode; and a subtracter adapted to receive the current estimated disturbance value from the switching unit and adapted to subtract the current estimated disturbance value from the control signal, wherein the head driving system moves the head across a disk by generating a driving current corresponding to an output signal output by the subtracter and generates the servo output signal in accordance with the motion of the head.

BRIEF DESCRIPTION OF THE DRAWINGS

Embodiments of the invention will be described herein with reference to the accompanying drawings, in which.

DESCRIPTION OF EMBODIMENTS

Figure 1:
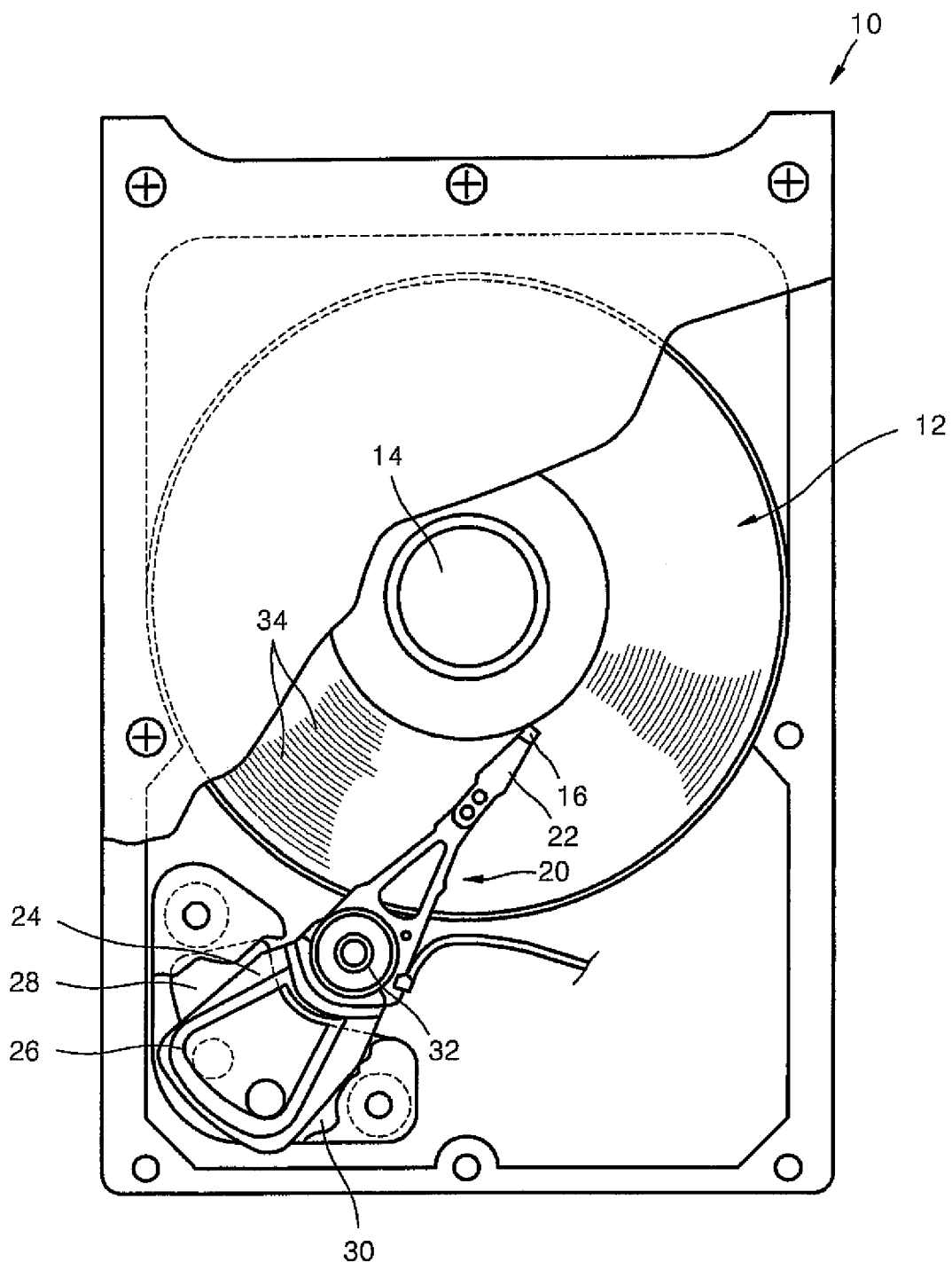
FIG. 1 is a schematic plan view of a head disk assembly (HDA) of a hard disk drive (HDD) to which an embodiment of the invention may be applied.

FIG. 1 is a schematic plan view of a head disk assembly (HDA) 10 of a hard disk drive (HDD) to which an embodiment of the invention may be applied. Referring to FIG. 1, HDA 10 comprises at least one magnetic disk 12 rotated by a spindle motor 14. HDA 10 also comprises a transducer (not shown) located above a surface of disk 12 (as oriented in FIG. 1, wherein HDA 10 is shown from above).

The transducer can read data from rotating disk 12 by sensing a magnetic field on the surface of disk 12, and can write data to rotating disk 12 by magnetizing the surface of disk 12. Typically, the transducer is mounted facing the surface of disk 12. Though a single transducer is described herein, the transducer comprises a write transducer that magnetizes disk 12 and a separate read transducer that senses a magnetic field of disk 12. The read transducer comprises a magneto-resistive (MR) component.

The transducer can be mounted on a head 16. Head 16 generates an air bearing between the transducer and the surface of disk 12. Head 16 is connected to (i.e., combined with) a head stack assembly (HSA) 22. HSA 22 is attached to an actuator arm 24 having a voice coil 26. Voice coil 26 is located adjacent to a magnetic assembly 28 to define a voice coil motor (VCM) 30. A current supplied to voice coil 26 generates a torque which rotates actuator arm 24 around a bearing assembly 32. The rotation of actuator arm 24 moves the transducer across the surface of disk 12.

Information is typically stored in concentric tracks of disk 12. Each track 34 comprises a plurality of sectors, and each sector comprises a data field and an identification field. The identification field comprises gray code used to identify a sector and a track (cylinder). The transducer moves across the surface of disk 12 to a track from which it will read data or to which it will write data.

Figure 2:
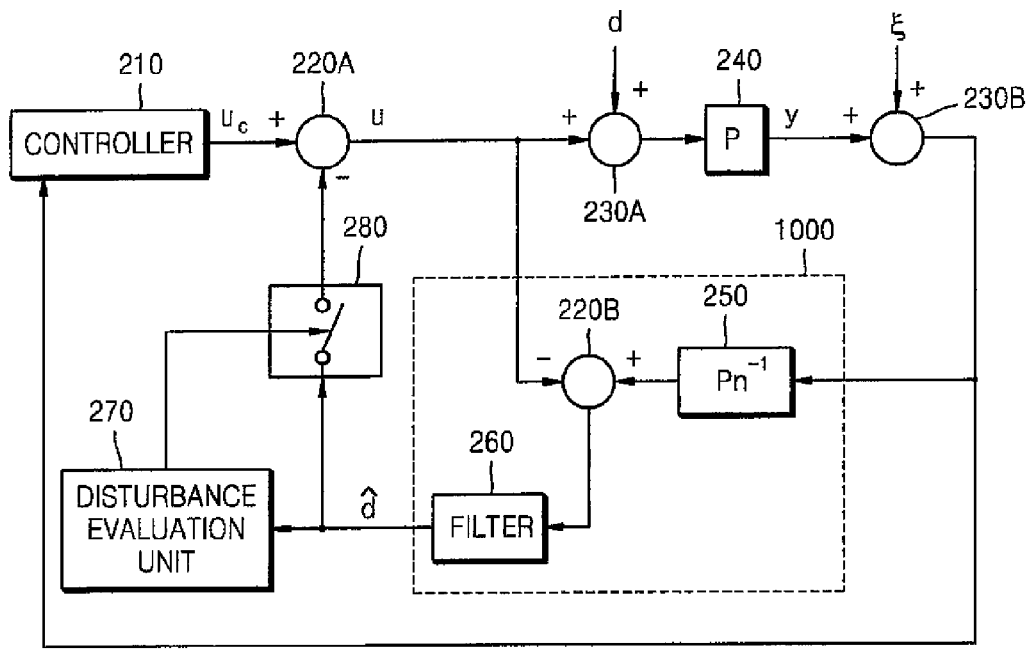
FIG. 2 is a block diagram of a servo control system comprising a disturbance compensation determination apparatus in accordance with an embodiment of the invention.

FIG. 2 is a block diagram of a servo control system comprising a disturbance compensation determination apparatus in accordance with an embodiment of the invention. Referring to FIG. 2, the servo control system comprises a controller 210, subtracters 220A and 220B, a plant 240, a nominal plant inverse modeling tool 250, a filter 260, a disturbance evaluation unit 270, and a switching unit 280.

In addition, a portion (i.e., block) of the servo control system of FIG. 2 comprising nominal plant inverse modeling tool 250, filter 260, and subtracter 220B may be referred to herein as a disturbance observer (DOB) 1000. DOB 1000 receives a control input signal u and a servo output signal y of plant 240, and calculates and outputs an estimated disturbance value d̂. In the embodiment illustrated in FIG. 2, the disturbance compensation determination apparatus comprises DOB 1000, disturbance evaluation unit 270, and switching unit 280.

The addition of disturbance d by adder 230A represents disturbance d applied to the servo control system and the addition of noise ξ by adder 230B represents noise ξ in the servo control system. Although noise ξ is added to servo output signal y of plant 240 by adder 230B, the resulting signal may still be referred to herein as servo output signal y of plant 240. In addition, disturbance d may represent disturbance applied to plant 240.

The disturbance compensation determination apparatus in accordance with an embodiment of the invention can be applied to various servo control systems. For convenience of description, an example in which the disturbance compensation determination apparatus is applied to a servo control system of a disk drive will be described herein. However, embodiments of the invention are not limited to only a servo control system of a disk drive.

If the disturbance compensation determination apparatus in accordance with an embodiment of the present invention is applied to a servo control system of a disk drive, plant 240 controlled in accordance with the servo control system may be a head driving system.

Controller 210 generates a control signal $u_c$ by estimating position, speed, and bias values of a head from a position error signal (PES), which corresponds to a servo output signal y of plant 240 and performing at least one calculation using the estimated position, speed, and bias values.

In general, since it is practically impossible to correctly (i.e., exactly) detect a characteristic of a real plant P of a system, real plant P is usually modeled using a low-order model for convenience of control system design. A difference between a modeled plant $P_n$ and the real plant P is generally focused on uncertainty of a high frequency band, and a difference between modeled plant $P_n$ and real plant P in a low frequency band can be ignored. Thus, if it is assumed that modeled plant $P_n$ is the same as real plant P and assumed that measured noise ξ does not exist, disturbance d can be obtained by calculating a difference between control input signal u and a value obtained by multiplying the servo output signal y by the inverse of the modeled plant $P_n^{-1}$.

However, since a physical system generally has a characteristic that an order of a denominator of a transfer function is greater than an order of a numerator of the transfer function, in order to calculate the inverse of modeled plant $P_n^{-1}$, a measured output must be differentiated by an amount equal to the difference between the order of a numerator of a transfer function of modeled plant $P_n$ and the order of a denominator of that transfer function. However, since high frequency noise ξ exists in a real system, it is relatively difficult to obtain the inverse of the plant using differentiation. The disturbance compensation determination apparatus comprises filter 260 in order to address this problem. By designing filter 260 such that a value obtained by subtracting an order of the numerator of a transfer function of filter 260 from an order of the denominator of the transfer function is greater than a value obtained by subtracting the order of the numerator of the transfer function of modeled plant $P_n$ from the order of the denominator, differentiation can be omitted. Filter 260 is designed as a low pass filter since noise ξ existing in the system exists in a high frequency band.

Nominal plant inverse modeling tool 250 and filter 260 are designed in accordance with the considerations described above.

Thus, if it is assumed that noise ξ does not exist and that real plant P 240 is modeled correctly, nominal plant inverse modeling tool 250 of DOB 1000 receives servo output signal y of plant 240 and outputs a modeling tool output signal u+d obtained by adding disturbance d to control input signal u. That is, the modeling tool output signal is a sum of control input signal u and disturbance d. Subtracter 220B subtracts control input signal u from modeling tool output signal u+d to generate a subtracter output signal equal to disturbance d. Subtracter 220B also outputs the subtracter output signal, which is equal to disturbance d, so subtracter 220B outputs disturbance d.

Noise ξ in the system generally exists in a high frequency band, and if filter 260 is designed as a low pass filter, high frequency noise ξ will be cancelled by filter 260. Thus, filter 260 outputs disturbance d. That is, low pass filter 260 receives the subtracter output signal and outputs only a low frequency band of the subtracter output signal, so low pass filter 260 outputs disturbance d.

However, it is practically impossible to correctly (i.e., exactly) model real plant P with a modeled tool. Thus, in practice, DOB 1000 outputs an estimated disturbance value d̂ that approximates (i.e., is an estimate of) disturbance d. In addition, modeling tool output signal u+d approximates (i.e., is at least approximately equal to) the sum of control input signal u and disturbance d.

In general, a control system compensating for disturbance (i.e., performing disturbance compensation) using DOB 1000 is less stable (i.e., has a lower stability margin) than a control system that does not compensate for disturbance.

In accordance with an embodiment of the invention, a control system selectively compensates for disturbance in accordance with results of analyzing estimated disturbance in order to improve the stability of a control system performing disturbance compensation.

A control system may be designed to have a simple disturbance threshold, wherein the control system compensates for disturbance when estimated disturbance exceeds the disturbance threshold and the control system does not compensate for disturbance when estimated disturbance does not exceed the disturbance threshold.

Figure 3:
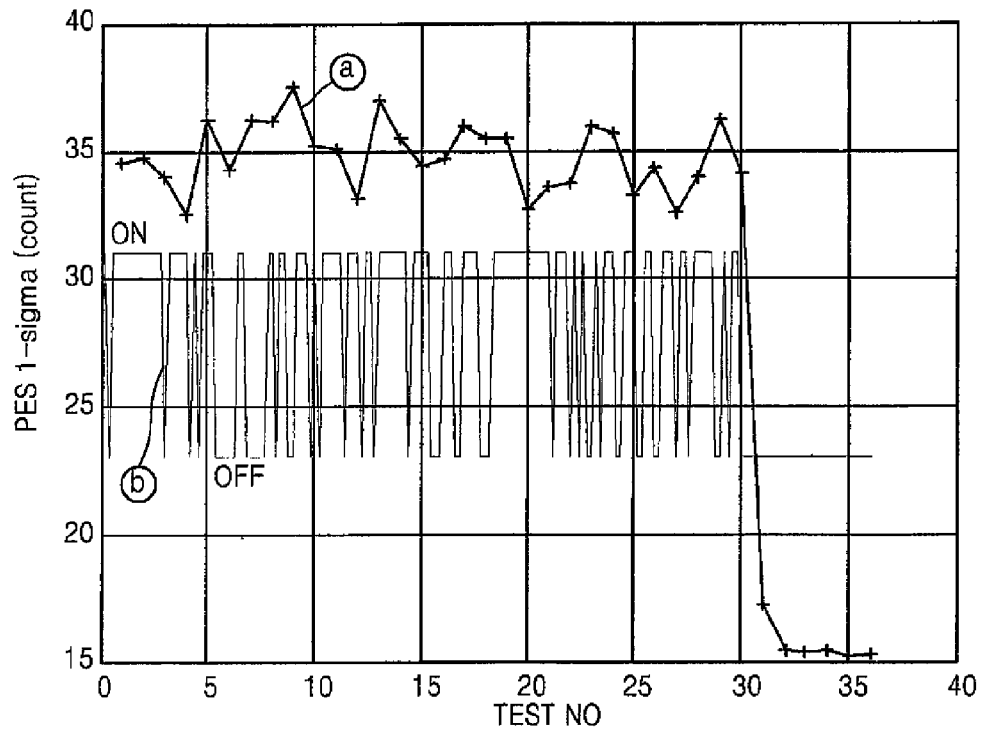
FIG. 3 is a graph showing changes in a disturbance compensation (DC) mode made by a disturbance compensation determination apparatus using a simple disturbance threshold.

For example, assuming that plant 240 is a head driving system of a disk drive, servo output signal y of plant 240 is a PES. When PES ⓐ illustrated in FIG. 3 is detected in a control system due to disturbance d that varies frequently around the disturbance threshold being applied to the head driving system, if the control system determines whether to compensate for disturbance d based simply on whether estimated disturbance exceeds the disturbance threshold, a disturbance compensation (DC) mode will frequently switch between a DC ON mode and a DC OFF mode, as illustrated by line ⓑ of FIG. 3, which illustrates the DC mode. Thus, determining whether to compensate for disturbance d as in the above example yields relatively poor disturbance suppression performance and results in an unstable system.

Thus, in order to address the drawback described above, in accordance with an embodiment of the invention, disturbance evaluation unit 270 determines, as described below, whether to compensate for disturbance d, and uses switching member 280 to implement its decision.

Referring to FIG. 2, disturbance evaluation unit 270 determines whether to change a current DC mode of the control system in which it is disposed. Disturbance evaluation unit 270 makes the determination by, during each of a plurality of sample periods, accumulating absolute values of estimated disturbance values $\hat{d}$ calculated by DOB 1000 (and provided to disturbance evaluation unit 270) during a current sample period and evaluating accumulated estimated disturbance values in accordance with a condition corresponding to the current DC mode.

Switching member 280 is adapted to receive estimated disturbance value $\hat{d}$ calculated by DOB 1000. When the current DC mode is the DC ON mode, switching member 280 outputs estimated disturbance value $\hat{d}$ to subtracter 220A. That is, switching member 280 provides estimated disturbance value $\hat{d}$ to a control loop of plant 240, wherein subtracter 220A is a part of the control loop of plant 240. Alternatively, when the current DC mode is the DC OFF mode, switching member 280 does not output (i.e., blocks) estimated disturbance value $\hat{d}$.

Thus, in the DC ON mode (i.e., when the current DC mode is the DC ON mode), subtracter 220A compensates for disturbance d by subtracting estimated disturbance value $\hat{d}$ from control signal $u_c$ output from controller 210. In addition, in the DC OFF mode (i.e., when the current DC mode is the DC OFF mode), disturbance d is not compensated for since estimated disturbance value $\hat{d}$ is not subtracted from control signal $u_c$. In other words, disturbance is compensated for in the DC ON mode and disturbance is not compensated for in the DC OFF mode.

Operations of disturbance evaluation unit 270 will now be described in more detail. Operations of disturbance evaluation unit 270 are broken into sample periods. During each sample period, disturbance evaluation unit 270 receives at least one estimated disturbance value $\hat{d}$ (i.e., "sample") calculated by and received from DOB 1000 and calculates an accumulated estimated disturbance value A by adding the respective absolute values of all of the at least one estimated disturbance values $\hat{d}$ that have been received during the current sample period.

When the current DC mode is the DC OFF mode, disturbance evaluation unit 270 determines whether an ON-transition condition has been met. Thus, the ON-transition condition corresponds to the DC OFF mode. When disturbance evaluation unit 270 determines that the ON-transition condition has been met, disturbance evaluation unit 270 changes the current DC mode to the DC ON mode. In addition, when disturbance evaluation unit 270 determines that the ON-transition condition has not been met, disturbance evaluation unit 270 does not change the current DC mode, so the current DC mode remains the DC OFF mode.

The ON-transition condition is met when, for each sample period of a threshold number N consecutive sample periods, an accumulated estimated disturbance value A calculated during the sample period was found to be greater than or equal to an upper threshold TH(H). Threshold number N and upper threshold TH(H) are each initially set values.

Figure 8:
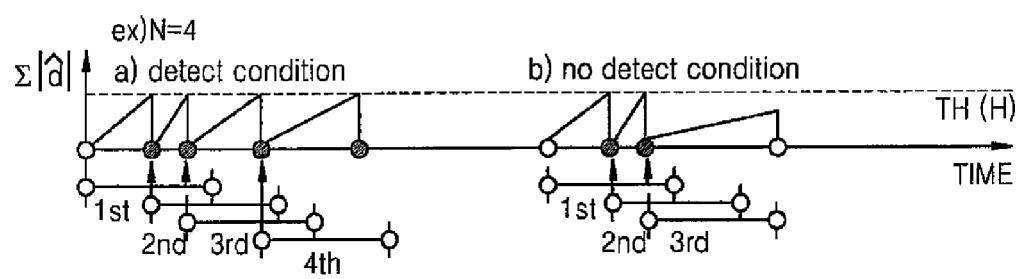
FIG. 8 is a diagram illustrating exemplary performance of the DC OFF mode portion of the disturbance compensation determination method in accordance with an embodiment of the invention; and, FIG. 9 is a diagram illustrating an exemplary performance of the DC ON mode portion of the disturbance compensation determination method in accordance with an embodiment of the invention.

For example, referring to part (a) of FIG. 8, when threshold number N is set to 4, if, as shown in part (a) of FIG. 8, for each of four consecutive sample periods an accumulated estimated disturbance value A calculated during the sample period is found to be greater than or equal to upper limit threshold TH(H), then the ON-transition condition is satisfied and disturbance evaluation unit 270 changes the current DC mode to the DC ON mode.

Figure 9:
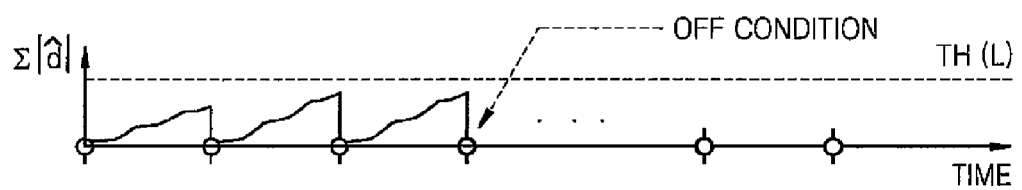

However, if the ON-transition condition is not met, then disturbance evaluation unit 270 does not change the current DC mode and the current DC mode remains the DC OFF mode. For example, as shown in part (b) of FIG. 8, if an accumulated estimated disturbance value A calculated during a first sample period is found to be greater than or equal to upper limit threshold TH(H), and an accumulated estimated disturbance value A calculated during a second sample period is found to be greater than or equal to upper limit threshold TH(H), but a third sample period ends before an accumulated estimated disturbance value A greater than or equal to upper limit threshold TH(H) is calculated during the third period, then the ON-transition condition is not met and the current DC mode remains the DC OFF mode. In FIGS. 8 and 9, accumulated estimated disturbance value A is represented by $\Sigma|\hat{d}|$.

When the current DC mode is the DC ON mode, disturbance evaluation unit 270 evaluates whether an OFF-transition condition has been met. Thus, the OFF-transition condition corresponds to the DC ON mode. When disturbance evaluation unit 270 determines that the OFF-transition condition has been met, disturbance evaluation unit 270 changes the current DC mode to the DC OFF mode, In addition, while disturbance evaluation unit 270 determines that the OFF-transition condition has not been met, disturbance evaluation unit 270 does not change the current DC mode and the current DC mode remains the DC ON mode.

The OFF-transition condition is met when, for each period of a threshold number M consecutive periods, a final accumulated estimated disturbance value A of the sample period is less than a lower limit threshold TH(L). The final accumulated estimated disturbance value A of a sample period is the accumulated estimated disturbance value A that is the sum of all of the estimated disturbance values $\hat{d}$ that will be calculated by DOB 1000 during that sample period. That is, the final accumulated estimated disturbance value A of a sample period is the accumulated estimated disturbance value A calculated after the last estimated disturbance value $\hat{d}$ (i.e., sample) of the sample period has been calculated. The last estimated disturbance value $\hat{d}$ is included in the calculation of the final accumulated estimated disturbance value A. In addition, if a current estimated disturbance value $\hat{d}$ is the final estimated disturbance value that will be calculated by DOB 1000 during the current sample period, then the accumulated estimated disturbance value A calculated after calculating current estimated disturbance value $\hat{d}$ (and including the current estimated disturbance value $\hat{d}$ in the calculation) is the final accumulated estimated disturbance value A of the current sample period. In the DC ON mode, each sample period has a fixed length. Threshold number M and lower threshold TH(L) are each initially set values.

For example, when threshold number M is set to 3, if, as shown in FIG. 9, for each of three consecutive sample periods, the final accumulated estimated disturbance value A of the sample period is less than lower threshold TH(L), then the OFF-transition condition is satisfied and disturbance evaluation unit 270 changes the current DC mode to the DC OFF mode. However, while the OFF-transition condition is not satisfied, disturbance evaluation unit 270 does not change the current DC mode, so the current DC mode remains the DC ON mode. For example, when threshold number M is set to 3, the OFF-transition condition would not be met if the final accumulated estimated disturbance value A of a first sample period were greater than lower threshold TH(L); the final accumulated estimated disturbance value A of a second sample period were less than lower threshold TH(L); the final accumulated estimated disturbance value A of a third sample period were less than lower threshold TH(L); but the final accumulated estimated disturbance value A of a fourth sample period were greater than lower threshold TH(L). That is, though the respective final accumulated estimated disturbance values A of two consecutive sample periods were less than lower threshold TH(L), the final accumulated estimated disturbance value A for the subsequent sample period (i.e., the fourth sample period) was greater than lower threshold TH(L), so the OFF-transition condition was not satisfied. The preceding example is not shown in FIG. 9.

Upper limit threshold TH(H) and lower limit threshold TH(L) are set such that upper limit threshold TH(H) is greater than lower limit threshold TH(L).

Figure 5:
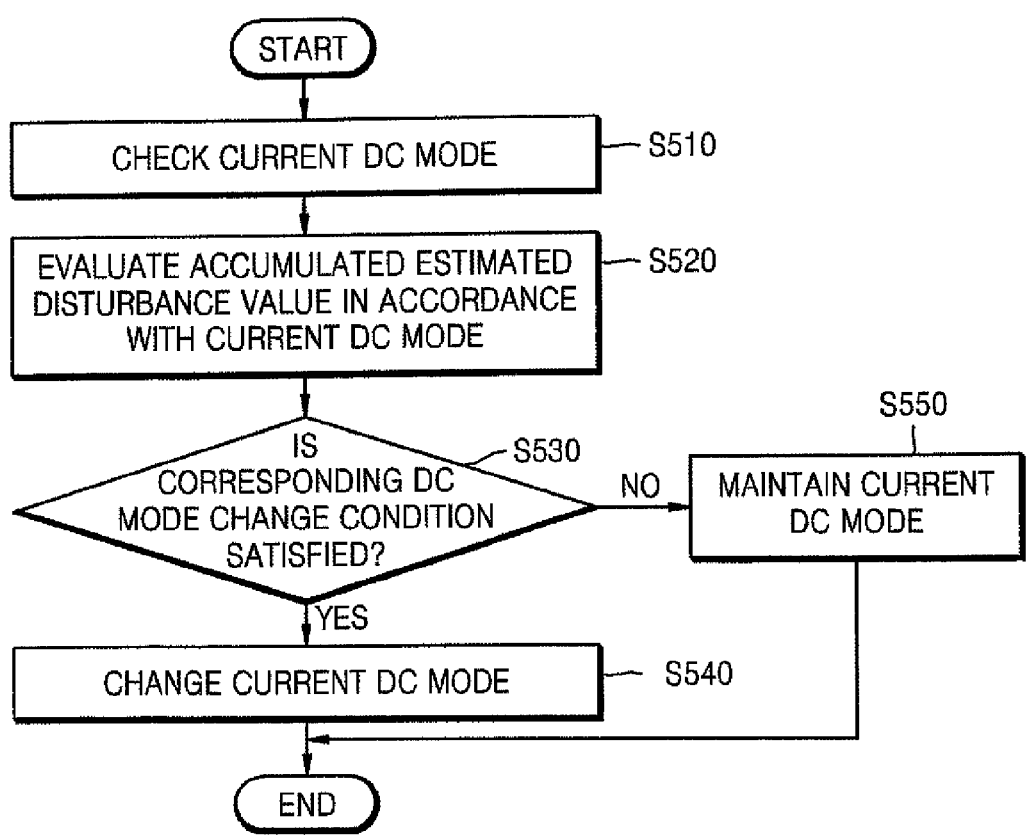
FIG. 5 is a flowchart illustrating a disturbance compensation determination method in accordance with an embodiment of the invention.

FIG. 5 is a flowchart illustrating a disturbance compensation determination method in accordance with an embodiment of the invention.

Referring to FIG. 5, a current DC mode is checked in operation S510. That is, whether the current DC mode is the DC ON mode or the DC OFF mode is determined. A system in which the method of FIG. 5 is performed is designed to compensate for the disturbance estimated by DOB 1000 when the system is in the DC ON mode and is designed to not compensate for the disturbance estimated by DOB 1000 when the system is in the DC OFF mode. When the system is initialized, the DC mode of the system can be set to, for example, the DC OFF mode.

After the current DC mode is determined, an accumulated estimated disturbance value is evaluated in accordance with the current DC mode in operation S520. That is, an accumulated estimated disturbance value is evaluated differently when the current DC mode is the DC ON mode than when the current DC mode is the DC OFF mode.

In operation S530, whether a corresponding DC mode change condition has been satisfied is determined. That is, when the current DC mode is the DC ON mode, whether the OFF-transition condition (which is the DC mode change condition corresponding to the DC ON mode) is satisfied is determined, and when the current DC mode is the DC OFF mode, whether the ON-transition condition (which is the DC mode change condition corresponding to the DC OFF mode) is satisfied is determined.

If it is determined in operation S530 that the corresponding DC mode change condition is satisfied, the current DC mode is changed (S540). However, if it is determined in operation S530 that the DC mode change condition is not satisfied, the current DC mode is maintained (S550).

Operations S520 through S550 will be described in more detail below with reference to FIGS. 6 and 7.

Figure 6:
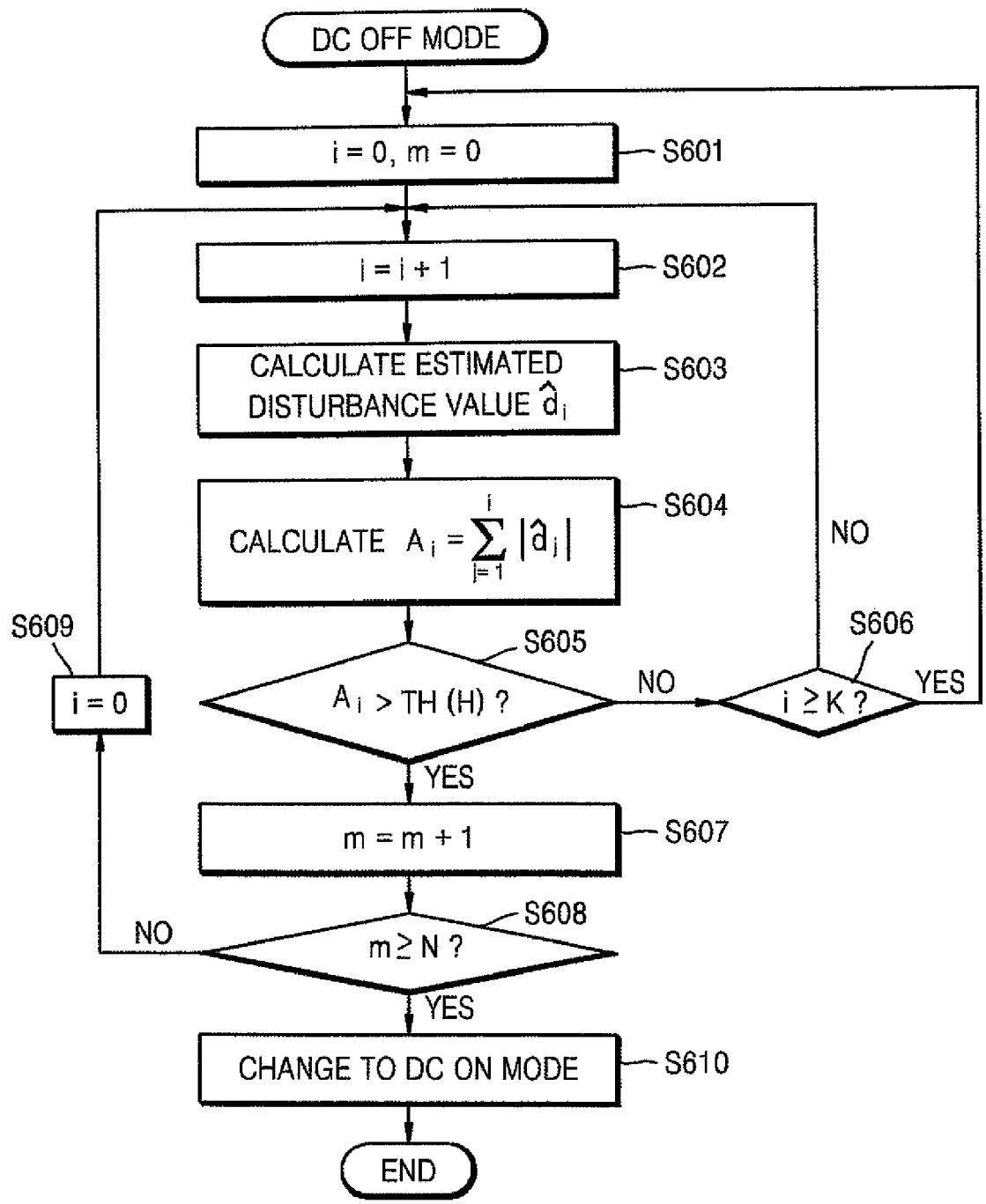
FIG. 6 is a flowchart illustrating a DC OFF mode portion of the disturbance compensation determination method in accordance with an embodiment of the invention.

FIG. 6 is a flowchart illustrating a DC OFF mode portion of the disturbance compensation determination method in accordance with an embodiment of the invention. That is, FIG. 6 is a flowchart of a method for performing operations S520 through S550 of FIG. 5 when the current DC mode is the DC OFF mode.

Referring to FIG. 6, internal counters i and m of disturbance evaluation unit 270 are each reset to 0 in operation S601. Counter i tracks the number of estimated disturbance values $\hat{d}_i$ (i.e., the number of samples) that have been calculated in the current sample period. In operation S602, counter i is incremented by 1. Then, in operation S603, an estimated disturbance value $\hat{d}_i$ (i.e., a current estimated disturbance value $\hat{d}_i$) is calculated using DOB 1000 (of FIG. 2).

In operation S604, an accumulated estimated disturbance value $A_i$ is calculated, wherein accumulated estimated disturbance value $A_i$ is the sum of the respective absolute values of the estimated disturbance values $\hat{d}_i$ that have been calculated during the current sample period. That is, accumulated estimated disturbance value $A_i$ is the sum of the respective absolute values of estimated disturbance values $\hat{d}_1$ through $\hat{d}_i$ of the current sample period.

Then, in operation S605, it is determined whether accumulated estimated disturbance value $A_i$ is greater than upper limit threshold TH(H). If it is determined in operation S605 that accumulated estimated disturbance value $A_i$ is not greater than upper limit threshold TH(H), the value of counter i is compared to an initially set sample period limit K in operation S606. In the method of FIG. 6, sample period limit K indicates the maximum number of samples that may be taken (i.e., the maximum number of estimated disturbance values $\hat{d}_i$ that may be calculated) in one sample period when determining whether the current DC mode should be changed to the DC ON mode. In addition, the maximum size of one sample period (i.e., the maximum number of samples that may be taken in one sample period) is set taking into account system characteristics and a mode of operation (i.e., use condition).

If it is determined in operation S606 that the value of counter i is less than the value of sample period limit K, then it is determined that the current sample period has not ended, and the method returns to operation S602 without resetting counter i to 0. However, if it is determined in operation S606 that the value of counter i is greater than or equal to sample period limit K, then it is determined that the current sample period has ended and the method returns to operation S601 to begin a new sample period beginning with the next estimated disturbance value $\hat{d}_i$ (i.e., sample) that is calculated. Also, when the method returns to operation S601, it means that the sample period that ended when performance was returned to operation S601 did not calculate an accumulated estimated disturbance value $A_i$ that was greater than upper threshold value TH(H), so that sample period is not counted as a consecutive sample period in which an accumulated estimated disturbance value $A_i$ greater than upper threshold value TH(H) was calculated. That is, m is not incremented when the method returns to operation S601, and, in fact, m is reset to 0 in operation S601 to restart the counting of consecutive sample periods in which an accumulated estimated disturbance value $A_i$ greater than upper threshold value TH(H) was calculated. In FIG. 6, m indicates the number of consecutive sample periods immediately preceding the current sample period (and possibly including the current sample period, depending on what operation in the method is currently being performed) in which an accumulated estimated disturbance value $A_i$ greater than upper threshold value TH(H) was calculated.

Referring again to operation S605, if it is determined in operation S605 that accumulated estimated disturbance value $A_i$ is greater than upper limit threshold TH(H), then counter m is incremented by 1 in operation S607.

After operation S607, the value of counter m is compared to an initially set threshold number N in operation S608. In the method of FIG. 6, threshold number N indicates how many consecutive sample periods in which an accumulated estimated disturbance value $A_i$ greater than upper limit threshold TH(H) was calculated must occur to satisfy the ON-transition condition. That is, to satisfy the ON-transition condition, an accumulated estimated disturbance value $A_i$ greater than upper limit threshold TH(H) must be calculated in each of threshold number N consecutive sample periods. In the examples of FIG. 8, N is set to 4.

If it is determined in operation S608 that the value of counter m is less than threshold number N, then it is determined that the ON-transition condition is not satisfied, so counter i is reset to 0 in operation S609 in order to start a new sample period beginning with the next estimated disturbance value $\hat{d}_i$ (i.e., sample) that is calculated, and the method returns to operation S602.

However, if it is determined in operation S608 that the value of counter m is greater than or equal to threshold number N, then it is determined that the ON-transition condition is satisfied, so the control mode is changed to the DC ON mode in operation S610. After the control mode has been changed to the DC ON mode, accumulated estimated disturbance value A is evaluated using the method illustrated in FIG. 7.

Figure 7:
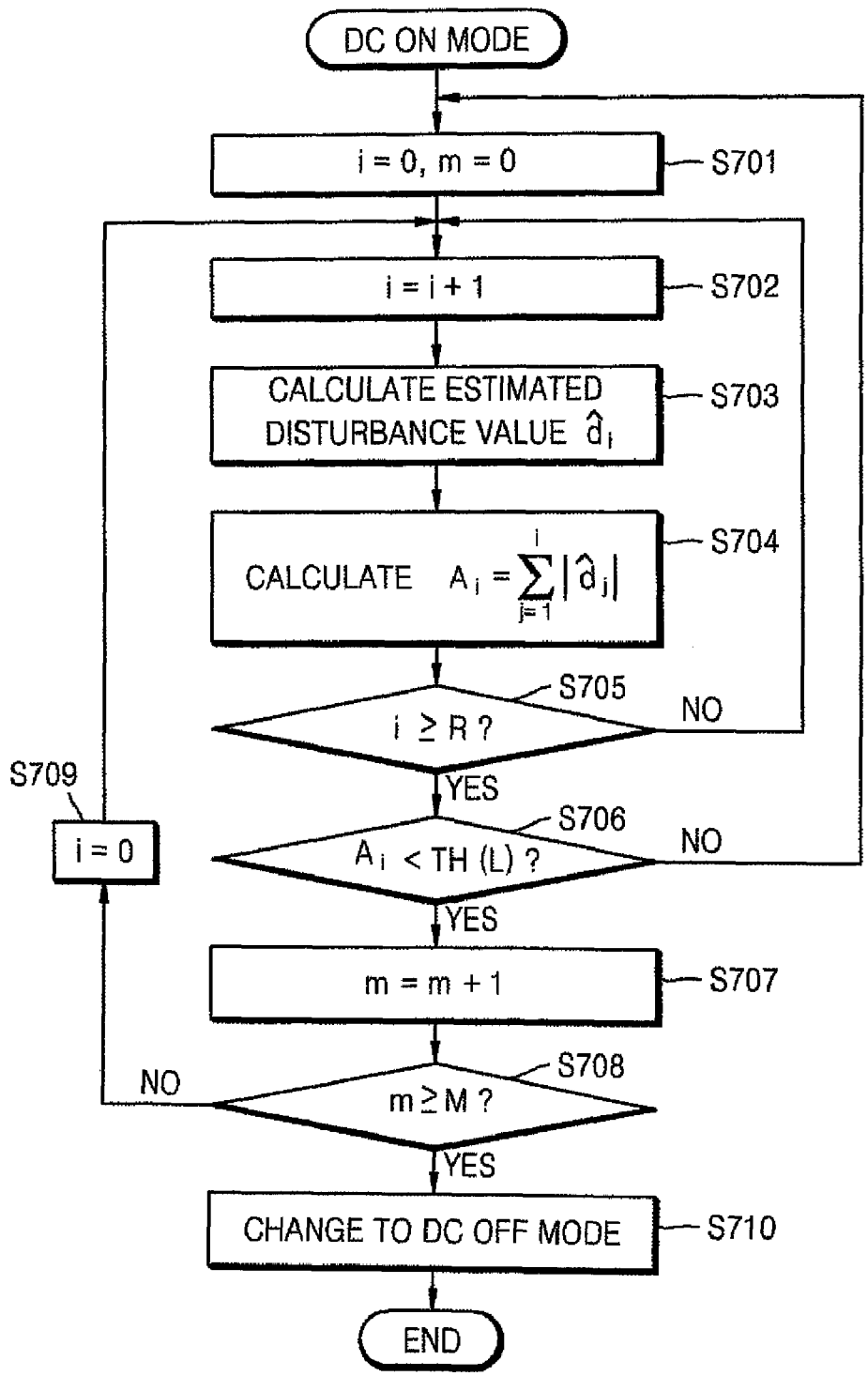
FIG. 7 is a flowchart illustrating a DC ON mode portion of the disturbance compensation determination method in accordance with an embodiment of the invention.

FIG. 7 is a flowchart illustrating a DC ON mode portion of the disturbance compensation determination method in accordance with an embodiment of the invention. That is, FIG. 7 is a flowchart of a method for performing operations S520 through S550 of FIG. when the current DC mode is the DC ON mode.

Referring to FIG. 7, internal counters i and m of disturbance evaluation unit 270 are reset to 0 in operation S701. In operation S702, counter i is incremented by 1. Then, in operation S703, an estimated disturbance value $\hat{d}_i$ (i.e., a current estimated disturbance value $\hat{d}_i$) is calculated using DOB 1000 (see FIG. 2).

In operation S704, accumulated estimated disturbance value $A_i$ is calculated, wherein accumulated estimated disturbance value $A_i$ is the sum of the respective absolute values of the estimated disturbance values $\hat{d}_i$ that have been calculated during the current sample period. That is, accumulated estimated disturbance value $A_i$ is the sum of the respective absolute values of estimated disturbance values $\hat{d}_1$ through $\hat{d}_i$ for the current sample period.

Then, in operation S705, the value of counter i is compared to an initially set sample period length R. In the method illustrated in FIG. 7, sample period length R indicates the number of samples taken (i.e., the number of estimated disturbance values $\hat{d}_i$ calculated) in each period during the DC ON mode when determining whether to change the current DC mode to the DC OFF mode. The size of one sample period (i.e., the number of samples taken in one sample period) is set taking into account system characteristics and a mode of operation (i.e., use condition).

If it is determined in operation S705 that the value of counter i is less than sample period length R, then it is determined that less than all of the estimated disturbance values $\hat{d}_i$ that will be calculated during the current sample period have been calculated. That is, it is determined that the final accumulated estimated disturbance value $A_i$ for the current sample period has not yet been calculated. Thus, the method of FIG. 7 returns to operation S702 in order to calculate another estimated disturbance value $\hat{d}_i$ to be used in calculating an accumulated estimated disturbance value $A_i$.

However, if it is determined in operation S705 that the value of counter i is greater than or equal to period length R, then it is determined that the estimated disturbance values $\hat{d}_i$ for the total number of samples of one sample period have been calculated and the final accumulated estimated disturbance value $A_i$ of the current sample period has been calculated. That is, if it is determined that the value of counter i is greater than or equal to period length R, then it is determined that the current accumulated estimated disturbance value $A_i$ is the final accumulated estimated disturbance value $A_i$ of the current sample period. The final accumulated estimated disturbance value $A_i$ of a sample period is the accumulated estimated disturbance value $A_i$ that is the sum of all of the estimated disturbance values $\hat{d}_i$ that will be calculated during the sample period. Then, in operation S706, it is determined whether the final accumulated estimated disturbance value $A_i$ of the current sample period, which was accumulated in operation S704, is less than lower limit threshold TH(L).

If it is determined in operation S706 that the final accumulated estimated disturbance value $A_i$ of the current sample period is greater than or equal to lower limit threshold TH(L), it is determined that the OFF-transition condition has not been satisfied, so the method of FIG. 7 returns to operation S701.

However, if it is determined in operation S706 that the final accumulated estimated disturbance value $A_i$ of the current sample period is less than lower limit threshold TH(L), then counter m is incremented by 1 in operation S707.

After operation S707, the value of counter m is compared to an initially set threshold number M in operation S708. In the method illustrated in FIG. 7, threshold number M indicates the number of consecutive sample periods for which the final accumulated estimated disturbance value $A_i$ must be less than lower limit threshold TH(L) to satisfy the OFF-transition condition. In the example illustrated in FIG. 9, M is set to 3.

If it is determined in operation S708 that the value of counter m is less than the value of threshold number M, then it is determined that the OFF-transition condition is not satisfied, so counter i is reset to 0 in operation S709 in order to start a new period beginning with the next estimated disturbance value $\hat{d}_i$ that is calculated, and then the method returns to operation S702.

If it is determined in operation S708 the value of the counter m is greater than or equal to threshold number M, then it is determined that the OFF-transition condition has been satisfied, so the current DC mode is changed to the DC OFF mode in operation S710. After the current DC mode has been changed to the DC OFF mode, accumulated estimated disturbance value A is evaluated using the method illustrated in FIG. 6.

In accordance with an embodiment of the invention, changing a current DC mode of a control system can be selectively performed in accordance with a disturbance compensation determination method so that changing the current DC mode is performed effectively with respect the stability of the control system.

Another embodiment of the invention provides a computer-readable medium storing a computer program for executing a disturbance compensation determination method in accordance with an embodiment of the invention. A disturbance compensation determination method in accordance with an embodiment of the invention has been described previously, so further description thereof will be omitted here.

Figure 4:
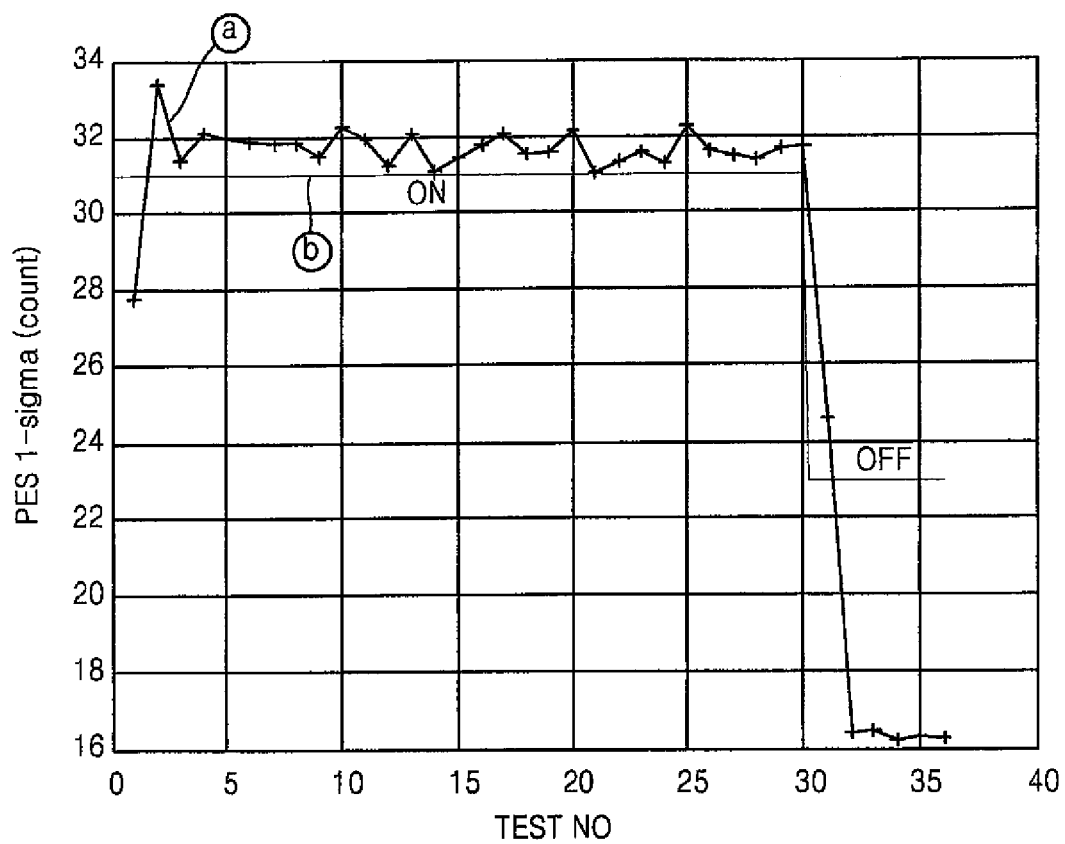
FIG. 4 is a graph showing a change in the DC mode made by a disturbance compensation determination apparatus in accordance with an embodiment of the invention.

Referring to FIG. 4, when a disturbance compensation determination method in accordance with an embodiment of the invention is applied to a disk drive, if the current DC mode is, for example, the DC ON mode, even if a PES ⓐ illustrated in FIG. 4 is detected due to disturbance that varies frequently being applied to a head driving system, the current DC mode exhibits stability (i.e., is changed stably), as illustrated by line ⓑ of FIG. 4, because the method, in accordance with at least one embodiment of the invention, determines whether to compensate for the disturbance by evaluating the disturbance using disturbance evaluation unit 270.

Embodiments of the invention can be applied in various types of disk drives, including HDDs.

In accordance with an embodiment of the invention, by determining whether to change a current DC mode by determining whether an ON-transition condition is satisfied during the DC OFF mode and determining whether an OFF-transition condition is satisfied during the DC ON mode, disturbance compensation can be selectively performed so that it is only performed during periods in which disturbance is negatively affecting system performance, which may result in an increase the stability of a system performing disturbance compensation.

Although embodiments of the invention have been described herein with reference to the accompanying drawings, changes may be made in the embodiments by one of ordinary skill in the art without departing from the scope of the invention as defined by the accompanying claims.

What is claimed is:

1. A disturbance compensation determination apparatus comprising:
   a disturbance observer (DOB) receiving a control input signal and a servo output signal of a plant, wherein the plant is controlled in accordance with the control input signal, the servo output signal corresponds to the control input signal, the DOB calculates and outputs a current estimated disturbance value, and the current estimated disturbance value is an estimate of disturbance applied to the plant;
   a disturbance evaluation unit selectively changing a current disturbance compensation (DC) mode, wherein selectively changing the current DC mode comprises evaluating an accumulated estimated disturbance value in accordance with a condition corresponding to the current DC mode, wherein:
      during a current sample period, the DOB calculates zero or more preceding estimated disturbance values before calculating the current estimated disturbance value; and,
      the disturbance evaluation unit calculates the accumulated estimated disturbance value by adding the absolute value of the current estimated disturbance value and the respective absolute values of the zero or more preceding estimated disturbance values; and,
   a switching unit selectively providing the current estimated disturbance value to a control loop of the plant in accordance with the current DC mode as selectively changed by the disturbance evaluation unit.

2. The disturbance compensation determination apparatus of claim 1, wherein, when the current DC mode is a DC OFF mode:
   the disturbance evaluation unit compares the accumulated estimated disturbance value to an initially set upper limit threshold;
   the disturbance evaluation unit changes the current DC mode to the DC ON mode if the disturbance evaluation unit determines that the current sample period is the N-th consecutive sample period in which the accumulated estimated disturbance value has been found to be greater than the upper limit threshold; and,
   N is an initially set threshold number.

3. The disturbance compensation determination apparatus of claim 1, wherein, when the current DC mode is the DC ON mode:
   the disturbance evaluation unit compares the accumulated estimated disturbance value to an initially set lower limit threshold when the accumulated estimated disturbance value is the final accumulated estimated disturbance value of the current sample period;
   the accumulated estimated disturbance value is the final accumulated estimated disturbance value of the current sample period when the current estimated disturbance value is the final estimated disturbance value calculated by the DOB during the current sample period;
   the disturbance evaluation unit changes the current DC mode to the DC OFF mode if the disturbance evaluation unit determines that the current sample period is the N-th consecutive sample period in which the final accumulated estimated disturbance value was found to be less than the lower limit threshold; and,
   N is an initially set threshold number.

4. The disturbance compensation determination apparatus of claim 1, wherein the DOB comprises:
   a nominal plant inverse modeling tool receiving the servo output signal and outputting a modeling tool output signal, wherein the modeling tool output signal is at least approximately equal to a sum of the control input signal and the disturbance applied to the plant;
   a subtracter subtracting the control input signal from the modeling tool output signal to generate a subtracter output signal; and,
   a low pass filter receiving the subtracter output signal and outputting only a low frequency band of the subtracter output signal.

5. A disturbance compensation determination method comprising:
   calculating a current estimated disturbance value, wherein the current estimated disturbance value is an estimate of disturbance applied to a plant;
   calculating an accumulated estimated disturbance value, wherein:
      during a current sample period, zero or more preceding estimated disturbance values were calculated before the current estimated disturbance value was calculated; and,
      calculating the accumulated estimated disturbance value comprises adding the absolute value of the current estimated disturbance value and the respective absolute values of the zero or more preceding estimated disturbance values;
   selectively changing a current disturbance compensation (DC) mode in accordance with the accumulated estimated disturbance value and a condition corresponding to the current DC mode; and,
   selectively performing disturbance compensation in a plant control system using the current estimated disturbance value and in accordance with the current DC mode as selectively changed.

6. The disturbance compensation determination method of claim 5, wherein the plant comprises a head driving system of a disk drive.

7. The disturbance compensation determination method of claim 5, wherein:
   calculating the current estimated disturbance value comprises estimating the disturbance applied to the plant from a subtracter output signal;
   the subtracter output signal is generated by subtracting a control input signal of the plant from a modeling tool output signal output by a nominal plant inverse modeling tool;
   the nominal plant inverse modeling tool receives a servo output signal of the plant; and,
   the modeling tool output signal is at least approximately equal to a sum of the control input signal and the disturbance applied to the plant.

8. The disturbance compensation determination method of claim 5, wherein selectively changing the current DC mode in accordance with the accumulated estimated disturbance value and a condition corresponding to the current DC mode comprises:
   when the current DC mode is a DC OFF mode, changing the current DC mode to a DC ON mode when an ON-transition condition is satisfied; and,
   when the current DC mode is the DC ON mode, changing the current DC mode to the DC OFF mode when an OFF-transition condition is satisfied,
   wherein the ON-transition condition and the OFF-transition condition are different.

9. The disturbance compensation determination method of claim 5, wherein selectively changing the current DC mode in accordance with the accumulated estimated disturbance value and a condition corresponding to the current DC mode comprises, if the current DC mode is a DC OFF mode:

comparing the accumulated estimated disturbance value to an initially set upper limit threshold; and,
changing the current DC mode to a DC ON mode if the current sample period is the N-th consecutive sample period in which the accumulated estimated disturbance value has been found to be greater than the upper limit threshold,
wherein N is an initially set threshold number.

10. The disturbance compensation determination method of claim 5, wherein selectively changing the current DC mode in accordance with the accumulated estimated disturbance value and a condition corresponding to the current DC mode comprises, if the current DC mode is a DC ON mode:
comparing the accumulated estimated disturbance value to an initially set lower limit threshold when the accumulated estimated disturbance value is the final accumulated estimated disturbance value of the current sample period, wherein the accumulated estimated disturbance value is the final accumulated estimated disturbance value of the current sample period when the current estimated disturbance value is the final estimated disturbance value estimated during the current sample period; and,
changing the current DC mode to a DC OFF mode if the current sample period is the N-th consecutive sample period in which the final accumulated estimated disturbance value was found to be less than the lower limit threshold,
wherein N is an initially set threshold number.

11. A computer-readable medium storing a computer program for executing a disturbance compensation determination method comprising:
calculating a current estimated disturbance value, wherein the current estimated disturbance value is an estimate of disturbance applied to a plant;
calculating an accumulated estimated disturbance value, wherein:
during a current sample period, zero or more preceding estimated disturbance values were calculated before the current estimated disturbance value was calculated; and,
calculating the accumulated estimated disturbance value comprises adding the absolute value of the current estimated disturbance value and the respective absolute values of the zero or more preceding estimated disturbance values;
selectively changing a current disturbance compensation (DC) mode in accordance with the accumulated estimated disturbance value and a condition corresponding to the current DC mode; and,
selectively performing disturbance compensation in a plant control system using the current estimated disturbance value and in accordance with the current DC mode as selectively changed.

12. A disk drive comprising:
a controller estimating state information corresponding to motion of a head from a servo output signal and generating a control signal in accordance with the estimated state information, wherein the state information comprises position, speed, and bias values corresponding to the motion of the head;
a disturbance observer (DOB) comprising a nominal plant inverse modeling tool, wherein the DOB estimates from the servo output signal an amount of disturbance applied to a head driving system using the nominal plant inverse modeling tool thereby calculating a current estimated disturbance value, and wherein the nominal plant inverse modeling tool implements the inverse of a function modeling the head driving system;
a disturbance evaluation unit selectively changing a current disturbance compensation (DC) mode, wherein selectively changing the current DC mode comprises evaluating an accumulated estimated disturbance value in accordance with a condition corresponding to the current DC mode, wherein:
during a current sample period, the disturbance evaluation unit calculates zero or more preceding estimated disturbance values before calculating the current estimated disturbance value; and,
the disturbance evaluation unit calculates the accumulated estimated disturbance value by adding the absolute value of the current estimated disturbance value and the respective absolute values of the zero or more preceding estimated disturbance values;
a switching unit receiving the current estimated disturbance value, outputting the current estimated disturbance value when the current DC mode is a DC ON mode, and not outputting the current estimated disturbance value when the current DC mode is a DC OFF mode; and,
a subtracter adapted to receive the current estimated disturbance value from the switching unit and adapted to subtract the current estimated disturbance value from the control signal,
wherein the head driving system moves the head across a disk by generating a driving current corresponding to an output signal output by the subtracter and generates the servo output signal in accordance with the motion of the head.

13. The disk drive of claim 12, wherein, when the current DC mode is the DC OFF mode:
the disturbance evaluation unit compares the accumulated estimated disturbance value to an initially set upper limit threshold;
the disturbance evaluation unit changes the current DC mode to the DC ON mode if the disturbance evaluation unit determines that the current sample period is the N-th consecutive sample period in which the accumulated estimated disturbance value has been found to be greater than the upper limit threshold; and,
N is an initially set threshold number.

14. The disk drive of claim 12, wherein, when the current DC mode is the DC ON mode:
the disturbance evaluation unit compares the accumulated estimated disturbance value to an initially set lower limit threshold when the accumulated estimated disturbance value is the final accumulated estimated disturbance value of the current sample period;
the accumulated estimated disturbance value is the final accumulated estimated disturbance value of the current sample period when the current estimated disturbance value is the final estimated disturbance value estimated by the DOB during the current sample period;
the disturbance evaluation unit changes the current DC mode to the DC OFF mode if the disturbance evaluation unit determines that the current sample period is the N-th consecutive sample period in which the final accumulated estimated disturbance value was found to be less than the lower limit threshold; and,
N is an initially set threshold number.

15. The disk drive of claim 12, wherein the servo signal comprises a position error signal (PES).

* * * * *